United States Patent [19]
Terry

[11] Patent Number: 6,120,075
[45] Date of Patent: *Sep. 19, 2000

[54] PORTABLE EXTENDABLE CARGO DECK

[76] Inventor: Kenneth A. Terry, 8001 E. 16th, Apt. B, Anchorage, Ak. 99504

[ * ] Notice: This patent issued on a continued prosecution application filed under 37 CFR 1.53(d), and is subject to the twenty year patent term provisions of 35 U.S.C. 154(a)(2).

[21] Appl. No.: 09/000,526

[22] Filed: Dec. 30, 1997

[51] Int. Cl.⁷ .................................................. B62C 1/06
[52] U.S. Cl. .................... 296/26.09; 296/37.8; 296/37.1; 224/403
[58] Field of Search ............................... 296/26.08, 26.09, 296/37.1, 26.1, 37.6, 37.8; 414/522, 537; 224/403, 542; 214/83.24

[56] References Cited

U.S. PATENT DOCUMENTS

| | | | |
|---|---|---|---|
| 2,284,419 | 5/1942 | Greig | 296/26.09 |
| 2,549,018 | 4/1951 | Sarlo | 296/26.09 |
| 2,784,027 | 3/1957 | Temp | 296/26.09 |
| 2,788,137 | 4/1957 | Harkness | 296/26.09 |
| 2,792,137 | 5/1957 | Solomon et al. | 296/26.09 |
| 2,852,303 | 9/1958 | Hopson | 296/26.09 |
| 3,004,790 | 10/1961 | Mayer | 296/26.09 |
| 3,006,487 | 10/1961 | Gelli | 214/83.24 |
| 3,132,755 | 5/1964 | Greenslate | 214/83.24 |
| 3,726,422 | 4/1973 | Zelin | 296/26.09 |
| 4,133,571 | 1/1979 | Fillios | 296/26.09 |
| 4,305,695 | 12/1981 | Zachrich | 296/37.1 |
| 4,573,731 | 3/1986 | Knaack et al. | 296/376 |
| 4,824,158 | 4/1989 | Peters et al. | 296/37.6 |
| 4,842,175 | 6/1989 | Townsand | 296/37.8 |
| 4,950,123 | 8/1990 | Brockhaus | 296/26.09 |
| 4,993,088 | 2/1991 | Chudik | 296/26.09 |
| 5,064,335 | 11/1991 | Bergeron et al. | 296/26.09 |
| 5,098,146 | 3/1992 | Albrecht et al. | 296/26.09 |
| 5,127,697 | 7/1992 | St. Marie | 296/26.09 |
| 5,469,999 | 11/1995 | Phirippidis | 224/542 |
| 5,513,941 | 5/1996 | Kulas et al. | 296/26.09 |
| 5,603,439 | 2/1997 | Pineda | 224/403 |
| 5,649,731 | 7/1997 | Tognetti | 296/26.09 |
| 5,820,190 | 10/1998 | Benner | 296/26.09 |

*Primary Examiner*—Joseph D. Pape
*Assistant Examiner*—Kiran Patel

[57] ABSTRACT

A device that when installed in a vehicle's cargo area, features a latching sliding deck surface that can be extended beyond the interior of said vehicle, providing an area that can be used as a workspace and/or allowing materials to be placed and retrieved safely on the deck surface. Once materials are placed, the deck slides back into the vehicle for safe transportation. The sliding deck surface is fitted to a basic frame and supported by rollable bearings. The basic frame is secured to the vehicle through the use of devices that are installed in the vehicle first and then latched into brackets mounted along the side of the frame channel members.

2 Claims, 7 Drawing Sheets

Exploded view of the four main parts of the Portable Extendable Cargo Deck

Fig. 1

Exploded view of the four main parts of the
Portable Extendable Cargo Deck

Fig. 2

Basic Frame

Fig. 3

Sliding deck without handle and rear plate

Fig. 4

Sliding deck with release button, handle and rear plate

Fig. 5

Cutaway view of the sliding deck with latch release assembly

Fragmentary view of the basic frame upward facing center member where it meets the rear transverse brace. (shown without roller bearing)

Fig. 6

Style A                                         Style B

Fig. 7

Quick connect/disconnect units

Style A = most Ford applications (drivers side pictured)

Style B = most General Moters and Universal applications

Basic frame center member roller bearing and bolt.

Fig. 8

Left side basic frame and sliding deck orientation with vertical roller bearing as scene from the rear of the cargo deck. (horizontal roller bearing has been deleted in this view)

Fig. 9

Left side basic frame and sliding deck orientation with horizontal roller bearing as scene from the rear of the cargo deck. (vertical roller bearing has been deleted in this view)

Inward facing first side member (4) as viewed from above

Front — Rear horizontally oriented roller bearing (12)

vertically oriented roller bearings (11)

Fig. 12

Figure 12:
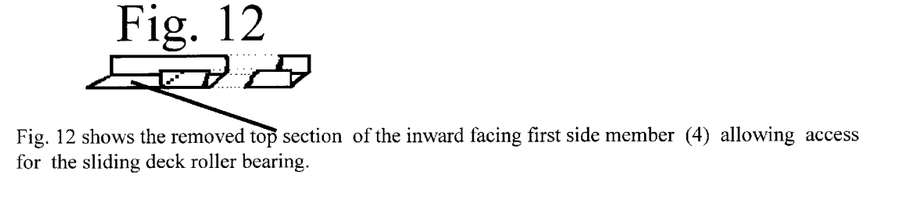
FIG. 12 shows the removed top section (30) of inward facing side member (4)
Figure 13:
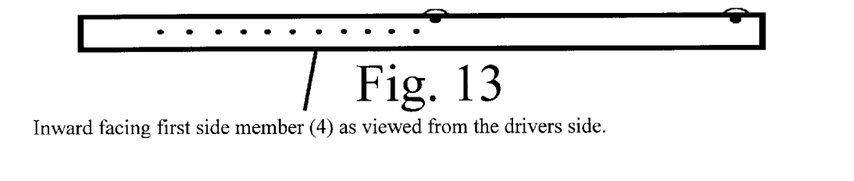
FIG. 13 shows the inward facing side member (4) as viewed from the side.
Figure 14:
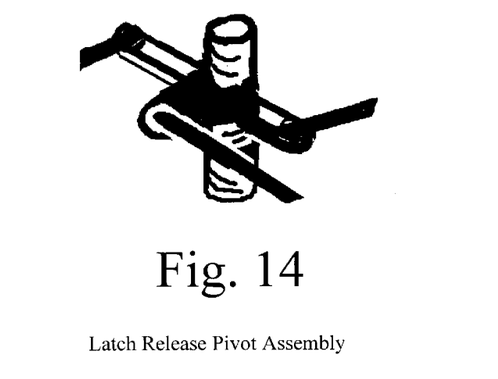
FIG. 14 shows the latch release pivot assembly
Figure 15:
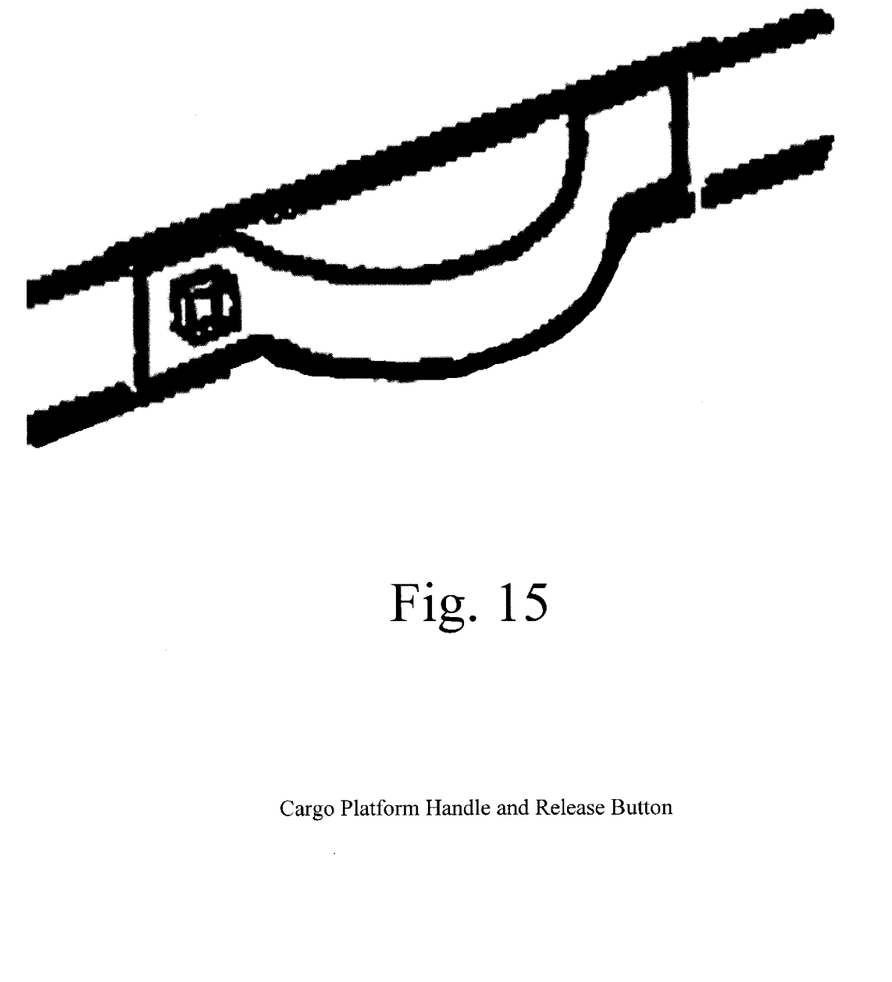
FIG. 15 shows the cargo platform handle and latch release button

Fig. 12 shows the removed top section of the inward facing first side member (4) allowing access for the sliding deck roller bearing.

Fig. 13

Inward facing first side member (4) as viewed from the drivers side.

Fig. 14

Latch Release Pivot Assembly

Fig. 15

Cargo Platform Handle and Release Button

PORTABLE EXTENDABLE CARGO DECK

BACKGROUND OF THE INVENTION

Field of the Invention

The present invention relates to a portable device used for permitting easier access to placing materials in a vehicle. More specifically, the present invention relates to a portable extendable deck that when installed in a vehicle, can extend beyond the interior of said vehicle, providing an area that can be used as a work space and/or a place where materials can be placed and retrieved safely on the extended deck surface. Once materials are placed, the extendable deck slides back into the vehicle for safe transportation. The device can be used with almost any vehicle having a relatively flat cargo area including full sized vans and minivans, station wagons, pickup trucks, buses, flat bed trucks and other large trucks. The device can be used by professional and nonprofessional people throughout the world.

It can be seen that the uses of this device are numerous, consequently, the specific description noted in this application is in no way meant to limit the use of the invention to the particular field chosen for exposition of the details of the invention.

All uses of this invention and its applications can only be limited by the imagination and are therefore not provided herein. Some of the more obvious applications are described herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for facilitating cargo storage and transportation are old and well known in the art. When my father brought our families first VW Bus, several features were impressive, especially the amount of space inside the vehicle. Since the late 1950's, there has been a steadily growing interest among consumers for vehicles that can carry greater amounts of materials and people, while remaining relatively small and affordable. Because of this interest, station wagons and minivans are the types of vehicles that have become more and more popular with consumers.

Some of the problems associated with these vehicles have been restricted access to the rear cargo area because large bumpers, tail gates, and trailer hitches that require a person to bend and reach to place materials into the vehicle, while trying to avoid injuries to their body or damaging their clothes.

Another problem exists because any solution requires that seating within the vehicle remain unaltered for the safety concerns of passengers, therefore the solution must permit temporary installation that does not interfere or change the interior construction of the vehicle in such a manner as to create an unsafe condition when passengers are present.

Other people have tried to solve this problem by inventing the "Lift Gate/Door" common on many minivans, and inventing: "Cargo Doors" which open like conventional hinged doors. These have helped but still have not solved the problem adequately because the "Lift/Gate Door" and the "Cargo Door" don't eliminate the bumper and trailer hitch hazards or allow the cargo area to extend beyond the interior boundaries of the vehicle.

Another problem is fork lift trucks cannot get close enough to the vehicle cargo bed area because of clearance problems between the lift/gate door(s) and the fork lift. Even though one solution to this problem was building extra long forks for the fork lift, my invention permits the use of standard length forks which are much more common in today's workplace. In addition, my invention solves the other above stated problems with a simplicity and effectiveness not rivaled in the prior art.

In order to provide background information so that the invention may be completely understood and appreciated in its proper context, reference is made to a number of prior art patents and publications as follows:

U.S. Pat. No. 5,603,439, issued to Adrian R. Pineda on Feb. 18, 1997, shows a truck cargo area organizer comprised of an outer frame, adjustable in width, by having telescoping transverse members; an inner smaller drawer frame, similarly adjustable in width, and dimensioned so that it can slide inside the outer frame by a tongue and groove arrangement; and several main separators or dividers, made to fit snugly each one between a pair of receiving notches inside the outer frame. The main separators are also adjustable in length, by a telescoping arrangement of their two halves, to fit within the inner frame dimensions. In addition, further smaller sub-separators or sub-dividers can be made to fit within the main separators, to further compartmentalize the whole structure. This device is mounted inside the truck body and is intended to provide an organized space within the truck body. By contrast, my invention permits the cargo area to remain within the body of the vehicle and also allows the cargo area to be extended beyond the body area of the vehicle while remaining securely attached to the vehicle.

U.S. Pat. No. 5,469,999, issued to George Phirippidis on Nov. 28, 1995, shows a modular storage and organizing system for vehicles which includes a plurality of generally box-shaped units and a lengthwise and depth-wise expandable floor rack for restraining the units from undesired movement during vehicle operation. The box units include a main trough box unit, a hanging file box unit, a storage box unit and an auxiliary box unit. Each box-shaped unit includes a plurality of side walls having a front panel, a rear panel spaced at a distance away from the front panel, a pair of spaced apart opposed side panels which connect the front and rear panels. At least one panel of each box unit, other than the auxiliary box unit, has an unflanged top edge. The floor rack is disposed onto a floor surface of the vehicle, with the box units disposed onto the rack.

The rack unit may be supported by stationary posts, or by a plurality of selectable lockable wheel assemblies. In either configuration, the rack unit is adjustable so as to vary the height of the wagon.

U.S. Pat. No. 4,842,175, issued to Marvin S. Towsend, shows a storage container for storing articles in the interior of an automobile includes an outer storage element and an inner storage element which are telescopically adjustable with respect to one another.

U.S. Pat. No. 4,573,731 (Knnack) shows a device that is a drawer, not a sliding deck, that is bolted onto the vehicle floor. In addition the following statement: "The skids are provided with suitable bolt openings 29 for use in securely bolting the storage unit 10 to the truck bed 11", is found in the DESCRIPTION OF THE PREFERRED EMBODIMENT Column 4, 2nd paragraph in Knnack's patent.

Of the other 14 patents listed in "Knnack" I was able to review (U.S. Pat. Nos. 4,469,364; 4,370,007; 4,328,989; 4,288,134; 4,283,083; 4,215,896; 4,167,233; 4,121,876; 4,112,539; 3,973,814; 3,826,529; 3,764,048; 3,647,105; and 3,581,929) all were either bolted or welded to the vehicle, or were different devices altogether. (i.e. U.S. Pat. No. 4,167, 233 is a baking pan) The other 16 patents listed in "Knnack" were not available in any databases I searched. However, as they were dated from July 1915 through July 1961, it seems unlikely that they contain any relevant information to the issue at hand.

An additional 22 patents describing devices used with vehicles (U.S. Pat. Nos. 5,820,190; 5,649,731; 5,513,941; 5,127,697; 5,098,146; 5,064,335; 4,993,088; 4,950,123; 4,842,175; 4,824,158; 4,573,731; 4,305,695; 4,133,571; 3,726,422; 3,132,755; 3,006,487; 3,004,790; 2,852,303; 2,792,137; 2,788,137; 2,784,027, 2,549,018 and 2,284,419) contain language stating each device is "bolted, welded, or screwed" onto the vehicle.

In addition, all of these devices placed the "bearings" on the floor of the vehicle, on the base frame or on the sliding frame and not on both frames like my invention.

Finally, my device permits quick detachment (10 seconds or less) of the sliding deck from the basic frame while the basic frame remains secured to the vehicle. This is a significant uniqueness in my invention, permitting substantially faster and greater flexibility in cleaning, maintaining, repairing, changing, installing and removing the device, than any other similar device known at present.

The remaining 2 patents (U.S. Pat. Nos. 5,469,999 and 5,603,439) are modular storage systems for vehicles and do not include a sliding deck in their construction.

If you look at patents by F. Gelli (U.S. Pat. No. 3,006, 487); Chudik (U.S. Pat. No. 4,993,731); and Tognetti (U.S. Pat. No 5,649,731), you will find that all three were accepted for patent protection, even though they have a similar appearance and similar descriptions regarding the device construction, (rails, bearings, tracks, deck, beams et cetera), just as many of the other patents reviewed above, while still lacking the unique ideas and features found in my invention.

Whatever the precise merits, features and advantages of the above cited references, none of them achieve or fulfills the purposes of the portable extendable cargo deck.

DETAILED DESCRIPTION

Figure 1:
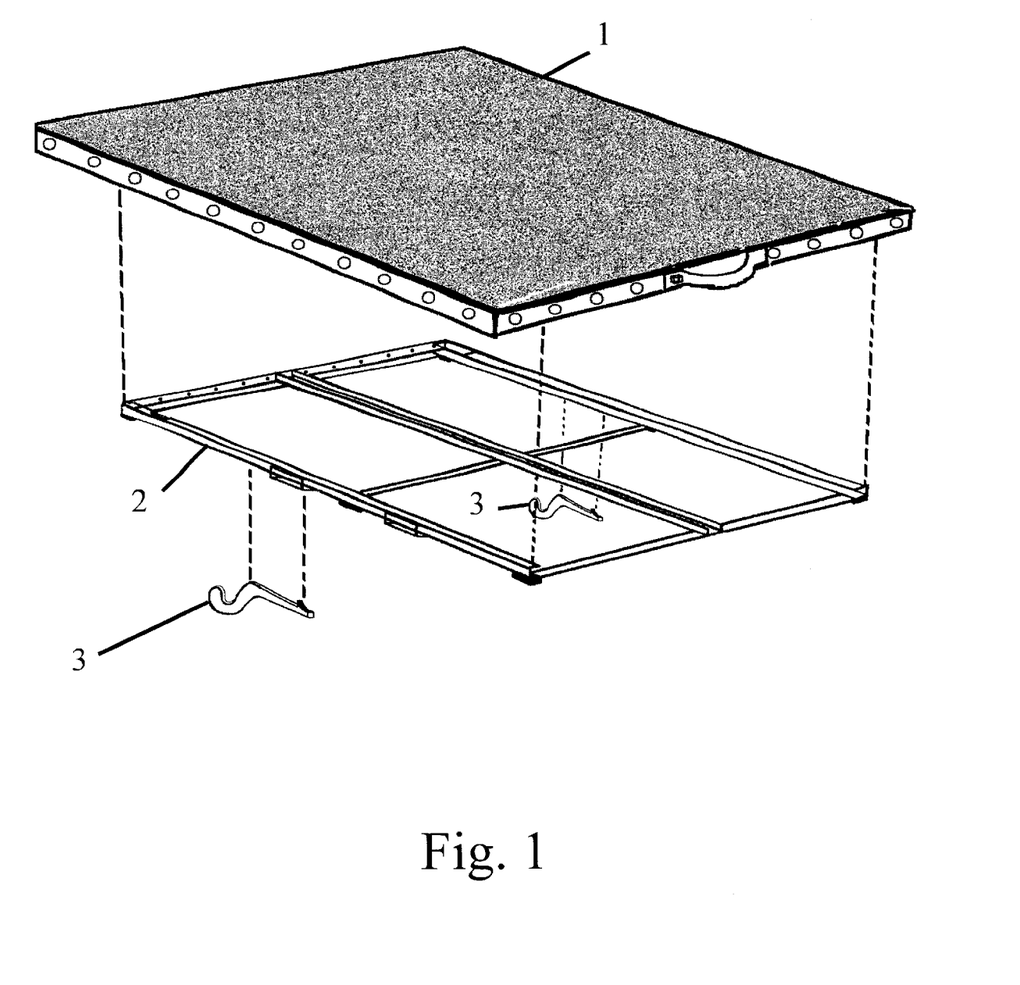
FIG. 1 is an exploded view of the four main parts of the Portable Extendable Cargo Deck

Referring to FIG. 1, an exploded view of the portable extendable cargo platform is illustrated comprising a sliding deck 1, a basic frame 2, and two (2) quick connect/ disconnect units 3. The sliding deck is designed to allow a maximum amount of travel so materials placed on it will not significantly compromise proper operation. The device can usually be secured in any of several positions and installed or removed from a vehicle within 3 to 5 minutes by almost any individual.

Figure 2:
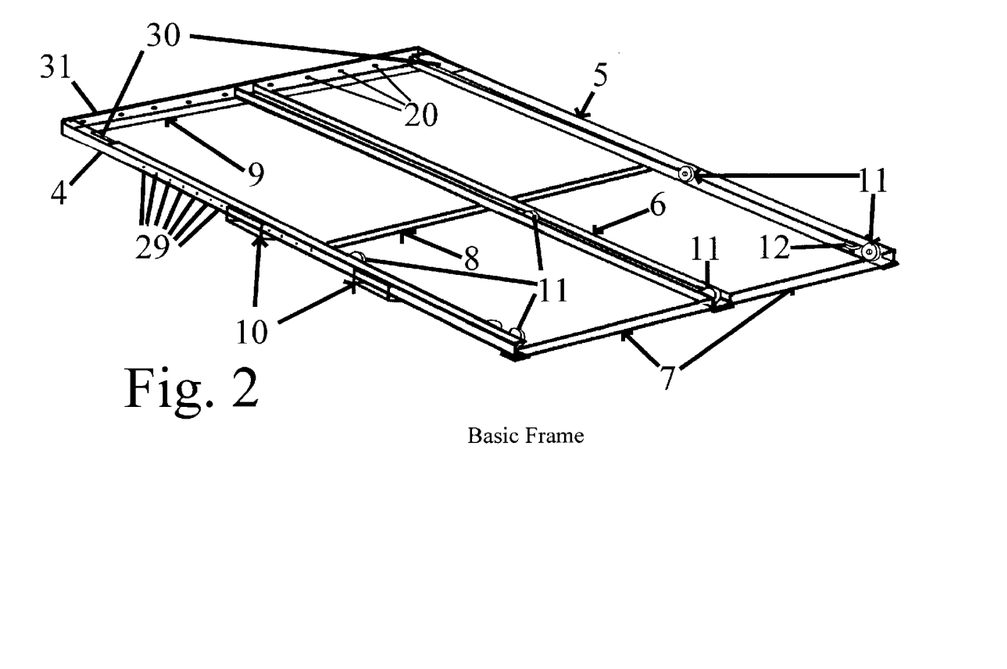
FIG. 2 shows the Basic Frame

Turning to FIG. 2, the basic frame comprises three (3) U-shaped channel members: an inward facing first side member 4, an inward facing second side member 5, and an upward facing center member 6, that are aligned parallel to each other and equally spaced apart laterally by two or more transverse braces 7, 8 & 9. First side member 4 and second side member 5 are fitted with two (2) or more U-shaped sleeves 10, that are permanently attached to the edge of each side member furthest away from the center member and at a point at least five inches from each end of the side members, for use in receiving the question mark shaped Quick Connect/Disconnect Units 3 that fit into the vehicles floor mounted seat securing mechanism, securing the basic frame to the vehicle. Both side members and the center member have at least two (2) vertically oriented rollable bearings 11, mounted approximately two (2) inches and twenty-four (24) inches from the rearward section of each member. The rollable bearings are attached in a manner that a section of each vertically oriented rollable bearing protrudes above the top edges of the side and center member with enough clearance to engage the sliding deck 1 to ensure freedom of movement. Both side members 4, 5 have an additional horizontally oriented rollable bearing 12 mounted next to the rearward vertically oriented rollable bearing. Both side members 4, 5 have a portion of the top forward end 30 removed to allow access for the sliding deck rollable bearings. The spacing of the basic frames inward facing side members 4, 5 aligns with the sliding deck frames roller bearings. A metal plate 31 or other suitable material containing holes 20 every two (2) to five (5) inches, is attached across the front so its top edge will be even with the top edges of all three channel members 4, 5 & 6. Finally, all three channels have rubber pads mounted on the bottom side of the channel to prevent damage to the vehicle floor.

Figure 3:
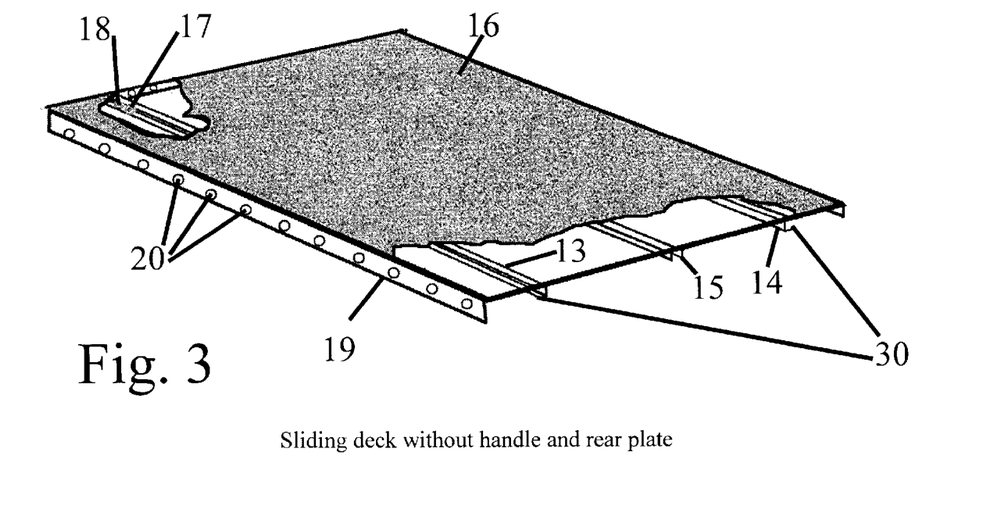
FIG. 3 shows a partial cutaway of the sliding deck without the handle and rear plate.
Figure 4:
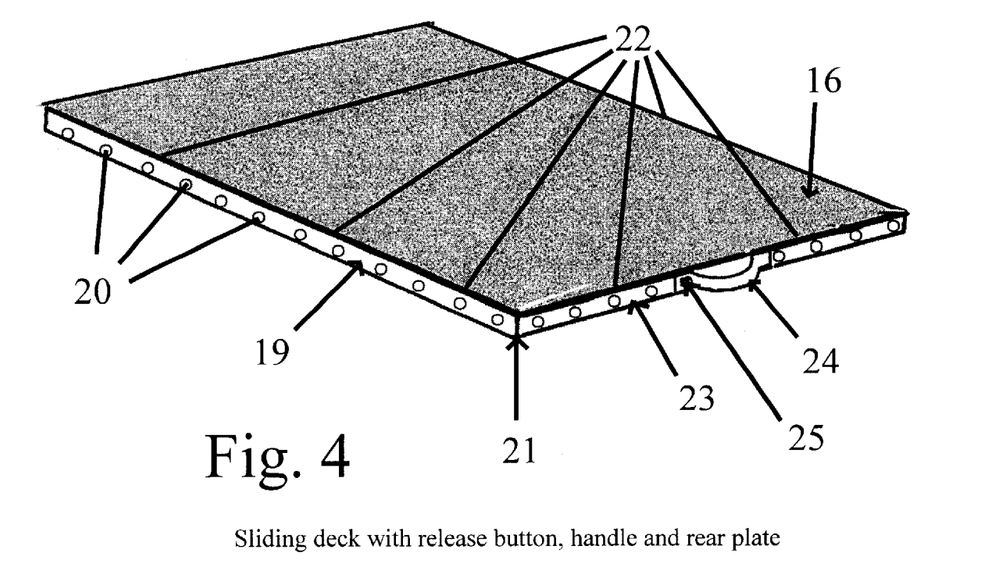
FIG. 4 shows the sliding deck with release button, handle and rear plate.
Figure 5:
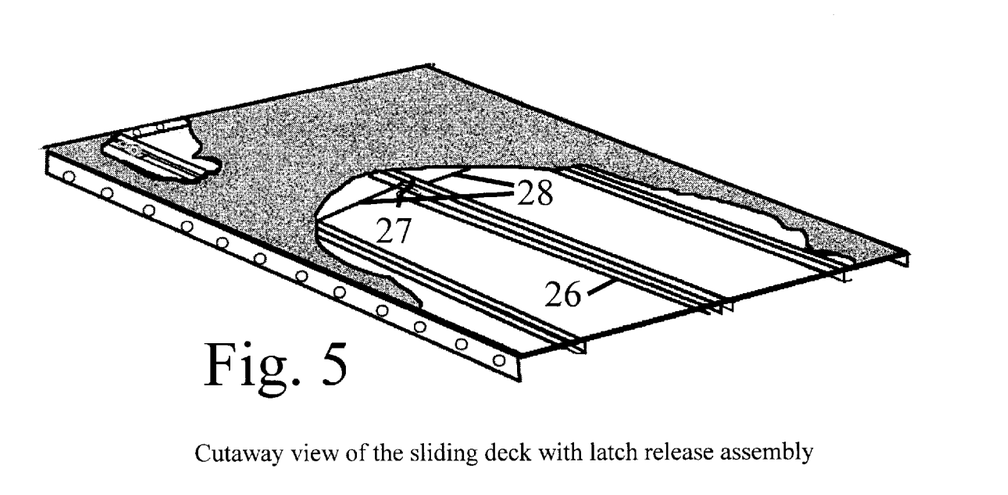
FIG. 5 shows a cutaway view of the sliding deck with the latch release assembly
Figure 6:
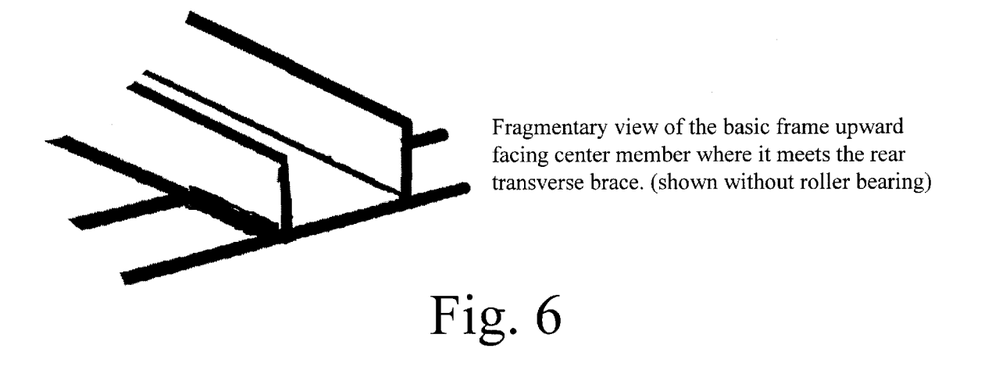
FIG. 6 is a fragmentary view of the basic frame upward facing center member where it meets the rear transverse brace.
Figure 7:
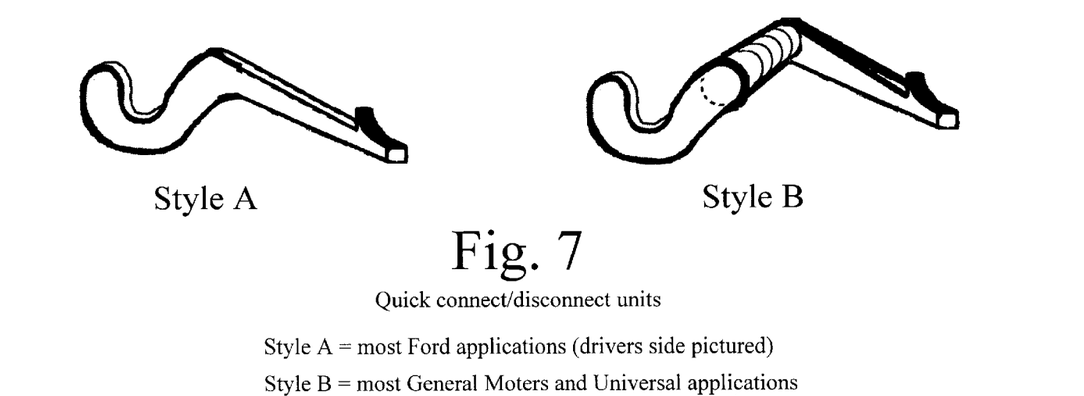
FIG. 7 shows the Quick Connect/Disconnect Units
Figure 8:
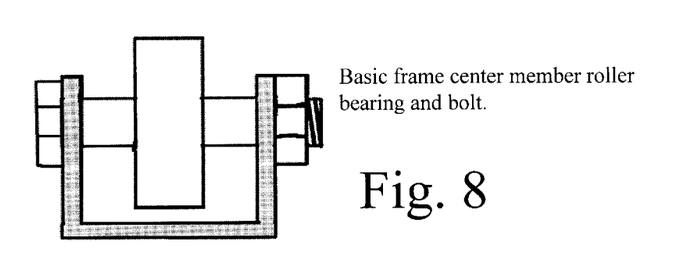
FIG. 8 shows a view of the basic frame center member roller bearing and bolt.
Figure 9:
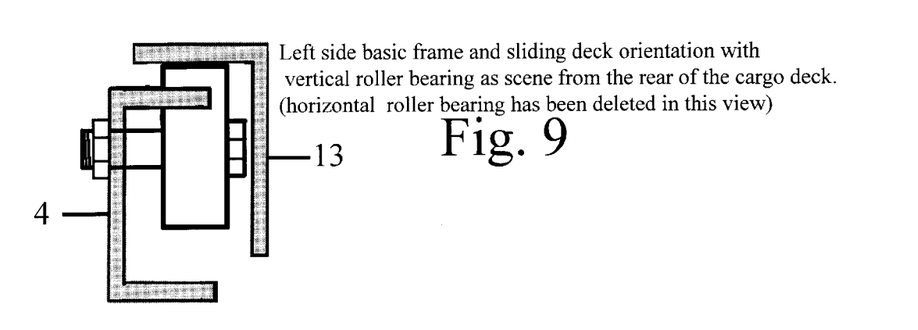
FIG. 9 shows the left side basic frame and sliding deck orientation with the vertical roller bearing as scene from the rear of the cargo deck.
Figure 10:
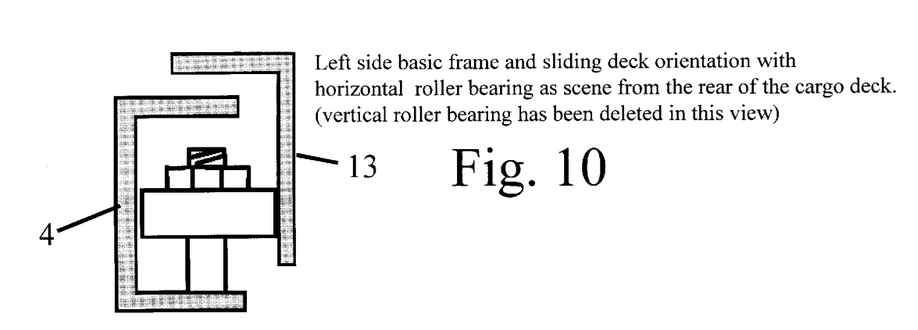
FIG. 10 shows the left side basic frame and sliding deck orientation with the horizontal roller bearing as scene from the rear of the cargo deck.
Figure 11:
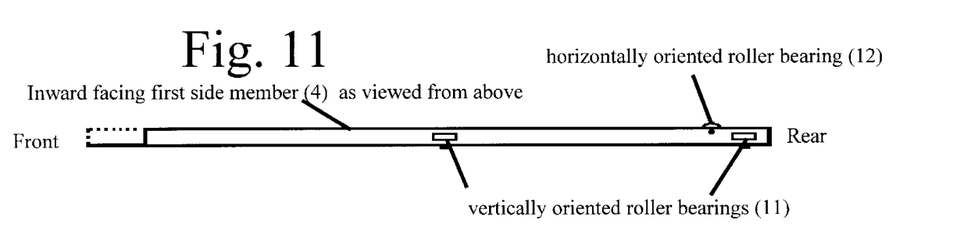
FIG. 11 shows inward facing side member (4) as view from above.

Turning to FIG. 3, the sliding deck comprises one (1) U-shaped channel member and two (2) L-shaped channel members: an outward facing first side member 13, an outward facing second side member 14, and a downward facing center member 15, that are aligned parallel to each other and equally spaced apart laterally, and attached along their top edge to the bottom edge of a piece of metal plate or other suitable decking material 16. All three members have vertically oriented rollable bearings 17 mounted near the forward edge of the platform. Both side members 13, 14 have an additional horizontally oriented rollable bearing 18 mounted next to the vertically oriented rollable bearing. The spacing of the sliding deck outward facing side members 13, 14 aligns with the basic frames rollable bearings. As shown in FIG. 4, a metal plate 19 or other suitable material containing holes 20 every two (2) to five (5) inches, useful in restraining shifting cargo, is attached where its ends meet to form a 90 degree angle 21, along its top edges 22, and to each side and rear edge, but not the front edge, of the sliding deck 16. On the rear plate 23, a handle 24 and button 25 are fastened, for releasing and latching the sliding cargo platform to the basic frame. As shown in FIGS. 4 and 5, the release button 25 is connected by a rod 26 to the release pivot assembly 27 that is mounted to the center channel member underneath the sliding deck. Locking rods 28 are attached to the latch release pivot assembly in the center member 15, and are placed in an alignment hole in each side member 13, 14. Pushing the release button actuates the pivot assembly and pulls the locking rods 28 from the respective holes (FIG. 2) 29 in the basic frames first and second side members 4 and 5 allowing the sliding deck to move out and back.

The portable extendable cargo deck can be assembled in the vehicle by first placing the quick connect/disconnect units into the vehicles floor mounted seat securing mechanisms, then placing the basic frame into the vehicle aligning and engaging the quick connect/disconnect units with the securing sleeves on each inward facing side member. The sliding deck is placed on top of the basic frame with the forward mounted rollable bearings placed into the bearing access section of the inward facing side members while holding the release button in. After the sliding deck rollable bearings are resting on the bottom edge of the basic frames inward facing side members the sliding deck is lowered until it rests on the basic frames rollable bearings. At this point the release button is disengaged and the portable extendable cargo deck is ready for use. To operate, press the release button and pull the sliding deck out. Release the button and the deck will lock in whichever location you select.

I claim:

1. A portable extendable cargo deck mechanism for use in a vehicle load/cargo area comprising:

a basic frame with three U-shaped channel members fitted with rollable bearings; that are aligned parallel to each other and equally spaced apart laterally by two or more transverse braces, a sliding deck with one U-shaped channel member and two L-shaped channel members fitted with rollable bearings to engage the basic frame, that are aligned parallel to each other and equally spaced apart laterally and attached to a metal plate or other suitable decking material, a handle and lock release button for moving and restraining the sliding deck at a selected extended position.

2. The portable extendable cargo deck in claim one further comprising:

rollable bearings positioned near the front of the sliding deck L-shaped channel members allowing the basic frame and the sliding cargo platform to be separated, U-shaped sleeves mounted on the basic frame members that permit the portable extendable cargo deck to be placed in many positions within the vehicle.

* * * * *